(No Model.) 3 Sheets—Sheet 1.
J. F. PATY & A. W. BIGHAM.
BALING PRESS.
No. 405,270. Patented June 18, 1889.
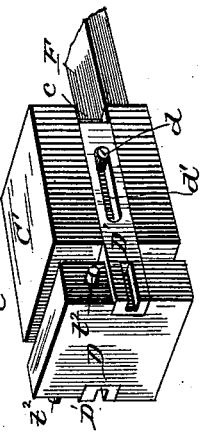
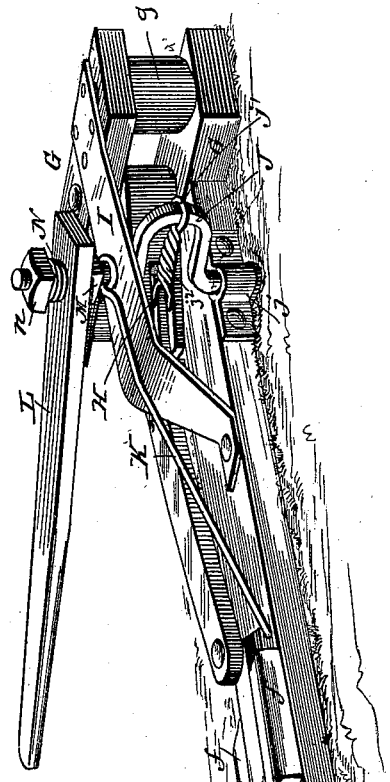
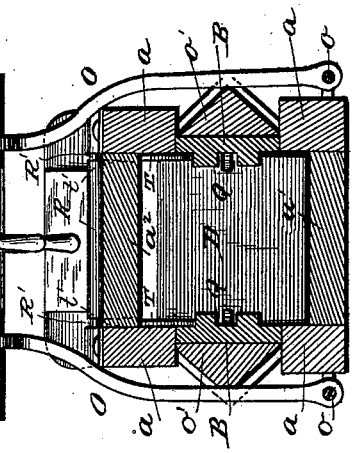
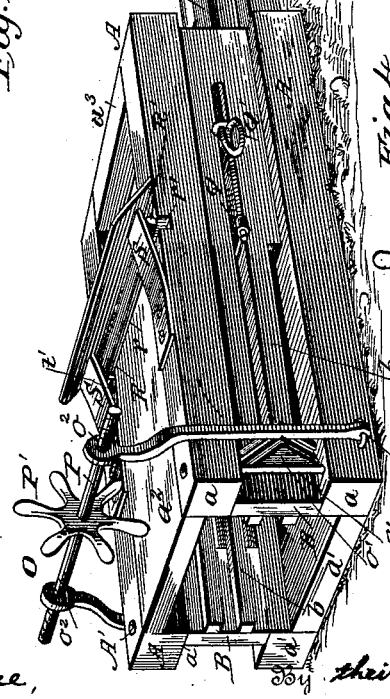
Witnesses
B. L. Dieterich
Wm. J. Littell
Inventors
John F. Paty
Ambrose W. Bigham
By their Attorney
J. R. Littell (No Model.)  3 Sheets—Sheet 2.
J. F. PATY & A. W. BIGHAM.
BALING PRESS.
No. 405,270.  Patented June 18, 1889.
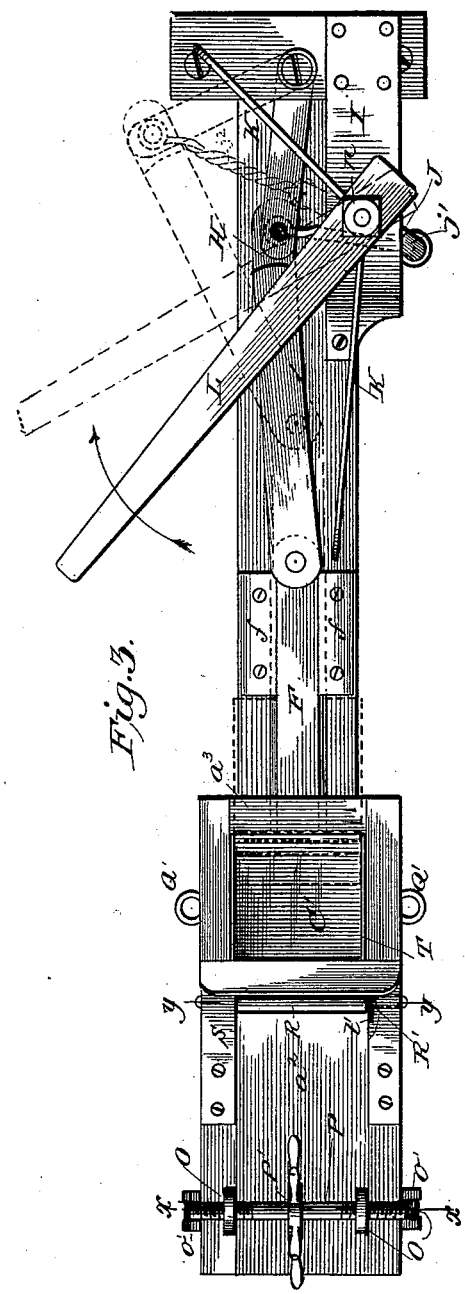
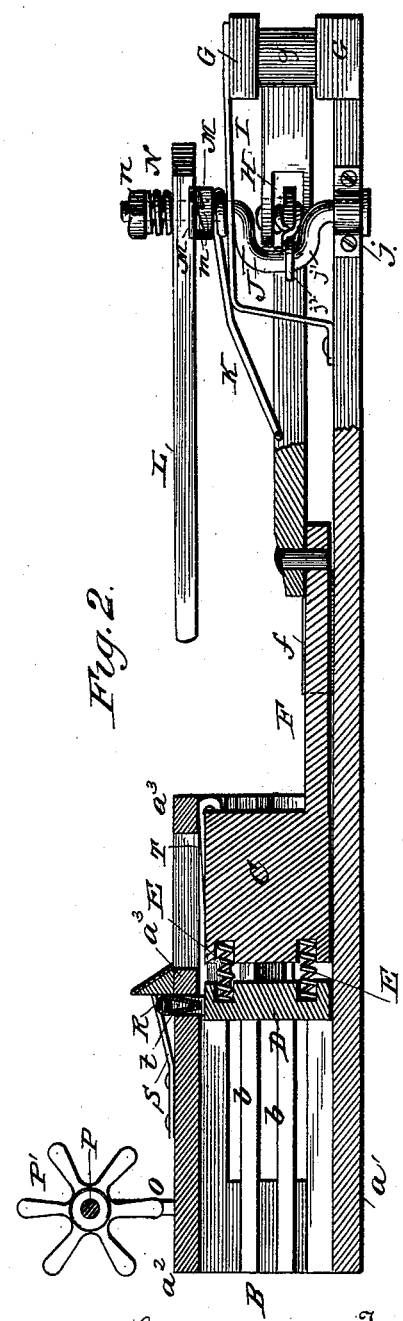

(No Model.) 3 Sheets—Sheet 3.
J. F. PATY & A. W. BIGHAM.
BALING PRESS.
No. 405,270. Patented June 18, 1889.
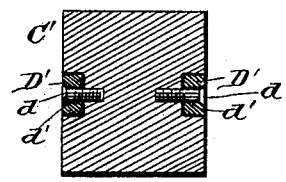
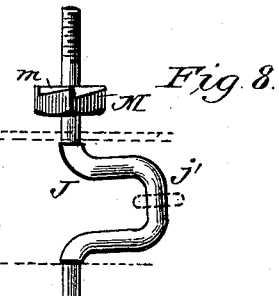
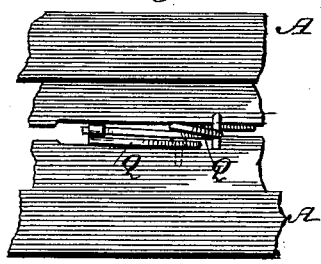
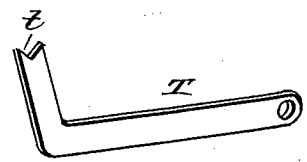
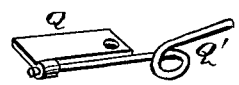
Witnesses
B. L. Dieterich
Wm. J. Littell
Inventors
John F. Paty
Ambrose W. Bigham
By their Attorney
J. R. Littell

UNITED STATES PATENT OFFICE.

JOHN F. PATY AND AMBROSE W. BIGHAM, OF BELTON, TEXAS.

BALING-PRESS.

SPECIFICATION forming part of Letters Patent No. 405,270, dated June 18, 1889.

Application filed October 13, 1888. Serial No. 288,008. (No model.)

*To all whom it may concern:*

Be it known that we, JOHN F. PATY and AMBROSE W. BIGHAM, citizens of the United States, residing at Belton, in the county of Bell and State of Texas, have invented certain new and useful Improvements in Bailing-Presses; and we do hereby declare that the following is a full, clear, and exact description of the invention, which will enable others skilled in the art to which it appertains to make and use the same.

This invention relates to baling-presses; and its object is to provide a new and improved machine of this character embodying continuous power mechanism, whereby the plunger is automatically operated.

A further object of the invention is the employment, in connection with the press, of a plunger provided with a spring-actuated face, whereby the plunger is caused to rebound after each stroke for the purpose herein specified.

A further object of the invention is to provide tension mechanism whereby both sides of the baling-chamber are tightened or released by a single adjustment.

In the drawings, Figure 1 is a perspective view of a baling-press embodying our invention. Fig. 2 is a longitudinal sectional view thereof. Fig. 3 is a top or plan view of the same. Fig. 4 is a transverse sectional view on line $x\,x$, Fig. 3. Fig. 5 is a transverse sectional view on line $y\,y$, Fig. 3. Fig. 6 is a detail perspective view of the plunger. Fig. 7 is a sectional view thereof. Fig. 8 is a view of the crank-shaft with the operating-lever removed. Fig. 9 is a bottom view of the inner end of the operating-lever. Fig. 10 is a detail side elevation of a portion of the press-box, showing one of the catches and its actuating-spring. Fig. 11 is a perspective view of one of the arms for operating the "tuck-board." Fig. 12 is a similar view of one of the spring-actuated catches.

Corresponding parts in the figures are denoted by the same letters of reference.

Referring to the drawings, A designates the baling-chamber, which is composed of a longitudinal beam $a$ at each corner, the lower ones of which being connected by the bottom $a'$, and the upper ones by the top $a^2$ and cross-beam $a^3$, the feed-opening being between the latter. Between the upper and lower beams are provided sides B, the rear portions of which consist of slats $b$, said upper and lower beams being connected by bolts A'. The bottom $a'$ is preferably extended at its front end some distance and upon said end is mounted the plunger-operating mechanism.

C designates the plunger, which comprises a body portion C', provided at its sides with longitudinal grooves $c\,c$ and a face-block D. The face-block D of the plunger is provided with two rearwardly-extending parallel arms D' D', adapted to engage and slide within the grooves $c$, and are retained therein by screws $d$, passing through longitudinal slots $d'\,d'$ in said arms and into the body C'. Between the body and the face of the plunger are disposed, preferably, coil-springs E, adapted to cause the main portion of the plunger to rebound at the end of its stroke.

From the forward end of the plunger at its lower edge projects an arm F, having its sides beveled, said arm passing through correspondingly-beveled guides $f$, secured to the extension of the bottom $a'$. At the front end of the latter are preferably provided two parallel cross-beams G G, connected by uprights $g\,g$. Between these uprights and to the free end of the arm F are pivoted the outer ends of a toggle-lever H. This toggle-lever comprises two rods pivoted together at their adjoining ends, one of said ends being bifurcated, while the other is reduced and disposed between the ends of the latter.

Secured at one end to the top one of the parallel cross-beams G, and connected at its other end with the extension of the bottom $a'$, is a horizontal plate I. Journaled in the latter, and in a bearing $j$ upon the extension of the bottom $a'$, is a vertical crank-shaft J, the crank-arm $j'$ of which is connected with the central pivot of the toggle-lever by a link $j^2$.

This shaft is braced by a rod K, through a loop at one end of which it passes, the opposite end of said rod being secured to the frame of the press.

L designates the operating-lever loosely mounted at its inner end upon the upper end of the crank-shaft. A clutch is formed between the lever and crank-arm by two corresponding ratchet-plates M M, one of which is rigidly secured to the under side of the lever, while the other is rigidly secured to the crank-shaft. The opposing faces of these plates are provided with teeth $m$, inclined upon one side, as shown. The plates are held in contact with each other by a coil-spring N, disposed upon the end of the crank-shaft above the operating-lever, said spring being retained in place and its tension adjusted by a nut $n$, screwed upon the screw-threaded end of said crank-shaft.

The operation of the above-described mechanism is as follows: To operate the plunger, the lever L is drawn around, preferably by horse-power, in a right-hand direction, describing in its movement a complete circle, thus permitting a continuous motion. As the lever is moved in this direction, the teeth upon the plates are locked together, causing the crank-shaft to rotate and operate the toggle-joint connection between the same and the plunger to give a forward movement to the latter. At the end of a stroke of the plunger (the stroke being accomplished by half a revolution of the operating-lever) the springs E are compressed, owing to the force exerted against the body of the plunger while the face is in contact with the material in the baling-clamber, and thus when the toggle-joint is slightly bent out of the approximately straight plane which it occupies at the completion of the stroke the springs cause the plunger to rebound (this being permitted by the ratchet-plates) to a position for the next stroke. By this operation, it will be obvious, the necessity of another half-revolution of the lever to return the plunger to its original position is dispensed with, thus giving two strokes during one revolution of the plunger instead of one, as would ordinarily be the case.

O designates the tension device for bending inwardly the ends of the slats $b$, which comprises two corresponding bars pivotally connected at their lower ends $o$ $o$ with the lower longitudinal beams of the baling-chamber at the opposite sides thereof. These bars engage projecting guides $o'$ $o'$ upon the slats, and are preferably bent inwardly near their upper portions, as shown. The adjusting-bar P is provided centrally with an operating-wheel P', and at one end with right-hand screw-threads, while the other is provided with left-hand screw-threads. These ends are adapted to engage correspondingly screw-threaded perforations $o^2$ $o^2$ in the free ends of the bars, the latter being drawn together or forced apart by the operation of the wheel P' to bend or release the slats, as desired.

Between each pair of the slats is pivoted a catch Q, normally held within the baling-chamber by springs Q', preferably of the construction shown, and secured at their front ends to the sides of the press by staples, said springs being adapted to exert a pressure against the free end of said catches. These catches are designed to automatically assume their normal position when the plunger rebounds after a stroke and prevent the material from following the latter.

The top of the baling-chamber is provided with a transverse slot $r$ in rear of the feed-opening, and the upper longitudinal beams of the press are grooved on a line with said slot, as shown at $r'$. Within these grooves are seated the bearings R' of a tuck-board R, normally retained therein by springs S S, secured upon the upper longitudinal beams. This tuck-board is automatically operated by two arms T T, pivoted within the baling-chamber near the front end thereof. At the rear ends of these arms are upward extensions T' T', at an angle thereto, and recessed at their extreme ends, as shown at $t$. The extensions T' project through small slots $t'$ $t'$ therefor in the top of the baling-chamber, and engage the bearings R'. The face of the plunger is provided at its sides with pins or lugs $l^2$, which engage the under edge of the arms T and elevate the same during the stroke of the plunger, said arms in turn elevating the tuck-board. When the plunger rebounds, the tuck-board returns to its normal position, its office being to turn down the edge of the material and thus make a smooth end to the bale.

We claim as our invention—

1. In a baling-press, the combination, with a plunger provided with a spring-actuated face-block, of a crank-shaft connected with said plunger and provided with an operating-lever, and a ratchet-connection between the latter and the crank-shaft, said ratchet, in connection with the spring-actuated face-block of a plunger, being adapted to permit the rebound of the plunger independent of the movement of the operating-lever, substantially as and for the purpose set forth.

2. In a plunger for baling-presses, the combination, with the body, provided at its sides with longitudinal grooves, of a face-block provided at each of its sides with a rearwardly-extending arm corresponding to and adapted to slide within said grooves, said arms having longitudinal slots engaged by pins in the body adapted to limit the forward movement of the face-block, and springs interposed between the latter and said body, substantially as and for the purpose set forth.

3. In a baling-press, the combination, with the baling-chamber and plunger, of a spring-held tuck-board, and angular arms pivoted to the sides of the press and engaging the bearings of said board, said arms being elevated during the stroke of the plunger by lugs on the latter to elevate the tuck-board, substantially as and for the purpose set forth.

4. In a baling-press, the combination, with the baling-chamber and plunger, of a spring-held tuck-board disposed in a slot in the top of the former, and corresponding oppositely-disposed arms pivoted at their front ends to the sides of the press and provided at their free ends with upwardly-projecting extensions engaging the bearings of said board, said arms being adapted to be elevated during the stroke of the plunger by lugs on the latter, substantially as and for the purpose set forth.

5. The herein-described baling-press, comprising the chamber having yielding sides and tension mechanism for compressing the same, a plunger provided with a spring-actuated face-block, a crank-shaft connected with said plunger and provided with an operating-lever, and a ratchet-connection between the latter and the crank-shaft, all arranged and adapted to operate substantially as and for the purpose set forth.

In testimony whereof we affix our signatures in presence of two witnesses.

JOHN F. PATY.
AMBROSE W. BIGHAM.

Witnesses:
JNO. M. FURMAN,
W. E. HALE.